US007219099B2

(12) United States Patent
Kuntala et al.

(10) Patent No.: US 7,219,099 B2
(45) Date of Patent: May 15, 2007

(54) DATA MINING MODEL BUILDING USING ATTRIBUTE IMPORTANCE

(75) Inventors: Pavani Kuntala, Nashua, NH (US); Gary L. Drescher, Cambridge, MA (US)

(73) Assignee: Oracle International Corporation, Redwood Shores, CA (US)

( * ) Notice: Subject to any disclaimer, the term of this patent is extended or adjusted under 35 U.S.C. 154(b) by 340 days.

(21) Appl. No.: 10/409,082

(22) Filed: Apr. 9, 2003

(65) Prior Publication Data

US 2003/0212691 A1 Nov. 13, 2003

Related U.S. Application Data

(60) Provisional application No. 60/379,104, filed on May 10, 2002.

(51) Int. Cl.
*G06F 7/00* (2006.01)

(52) U.S. Cl. .................... 707/100; 707/101; 707/104.1

(58) Field of Classification Search .......... 707/1–104.1
See application file for complete search history.

(56) References Cited

U.S. PATENT DOCUMENTS 6,032,146 A * 2/2000 Chadha et al. ................. 707/6
6,658,467 B1 * 12/2003 Rice et al. .................. 709/224
2002/0049720 A1 * 4/2002 Schmidt ........................ 707/1
2002/0111742 A1 * 8/2002 Rocke et al. ................. 702/19
2003/0144746 A1 * 7/2003 Hsiung et al. ................ 700/28
2003/0172043 A1 * 9/2003 Guyon et al. ................. 706/48

* cited by examiner

*Primary Examiner*—Alford Kindred
*Assistant Examiner*—Linh Black
(74) *Attorney, Agent, or Firm*—Bingham McCutchen LLP

(57) ABSTRACT

A system, method, and computer program product that uses attribute importance (AI) to reduce the time and computation resources required to build data mining models, and which provides a corresponding reduction in the cost of data mining. Attribute importance (AI) involves a process of choosing a subset of the original predictive attributes by eliminating redundant, irrelevant or uninformative ones and identifying those predictor attributes that may be most helpful in making predictions. A new algorithm Predictor Variance is proposed and a method of selecting predictive attributes for a data mining model comprises the steps of receiving a dataset having a plurality of predictor attributes, for each predictor attribute, determining a predictive quality of the predictor attribute, selecting at least one predictor attribute based on the determined predictive quality of the predictor attribute, and building a data mining model including only the selected at least one predictor attribute.

46 Claims, 7 Drawing Sheets

MATRIX OF CO-OCCURRENCES RATIOS FOR PREDICTOR ($P_i$)

| Predictor values:1-j Target values : 1-k | $P_i^1$ | $P_i^?$ | $P_i^?$ | $P_i^j$ |
|---|---|---|---|---|
| | $C(P_i^1 T_k)$ | $C(P_i^? T_k)$ | $C(P_i^? T_k)$ | $C(P_i^j T_k)$ |
| $T_1$ | $C(P(X_i^1) \cap T_1)/C(T_1)$ | $C(P(X_i^?) \cap T_1)/C(T_1)$ | $C(P(X_i^?) \cap T_1)/C(T_1)$ | $C(P(X_i^j) \cap T_1)/C(T_1)$ |
| $T_?$ | $C(P(X_i^1) \cap T_?)/C(T_?)$ | $C(P(X_i^?) \cap T_?)/C(T_?)$ | $C(P(X_i^?) \cap T_?)/C(T_?)$ | $C(P(X_i^j) \cap T_?)/C(T_?)$ |
| $T_?$ | $C(P(X_i^1) \cap T_?)/C(T_?)$ | $C(P(X_i^?) \cap T_?)/C(T_?)$ | $C(P(X_i^?) \cap T_?)/C(T_?)$ | $C(P(X_i^j) \cap T_?)/C(T_?)$ |
| $T_k$ | $C(P(X_i^1) \cap T_1)/C(T_k)$ | $C(P(X_i^?) \cap T_1)/C(T_k)$ | $C(P(X_i^?) \cap T_1)/C(T_k)$ | $C(P(X_i^j) \cap T_1)/C(T_k)$ |

412

VARIANCE OF PREDICTOR (PI) = SI =VARIANCE OF ALL THE ELEMENTS IN THE CO-OCCURANCE MATRIX FOR PREDICTOR(PI)

Fig. 4a

| Predictor P(X) |
|---|
| $P(X_i)$ |
| $P(X_1)$ |
| $P(X_2)$ |
| $P(X_?)$ |
| $P(X_{j-1})$ |
| $P(X_j)$ |
| $P(X_?)$ |
| $P(X_n)$ |

| Predictor P(Xi), value j |
|---|
| $P(X)_i^j$ |
| $P(X_i)$ - value 1 |
| $P(X_i)$ - value 2 |
| $P(X_i)$ .. |
| $P(X_i)$ – value j |
| $P(X_i)$ .. |
| $P(X_n)$ – value n |

| |
|---|
| Target T , value K |
| (Tk) |
| Target $T_1$ |
| Target $T_?$ |
| Target $T_?$ |
| Target $T_k$ |

| |
|---|
| Co-occurrence |
| Counts of Predictor |
| $P(X)_i^j$ and $T_k$ |
| $C(P(X)_i^j \cap T_k)$ |
| $C(P(X)_i^j \cap T_1)$ |
| $C(P(X)_i^j \cap T_?)$ |
| $C(P(X)_i^j \cap T_?)$ |
| $C(P(X)_i^j \cap T_k)$ |

| Apriori Counts of Targets |
| --- |
| $C(T_k)$ |
| $C(T_1)$ |
| $C(T_?)$ |
| $C(T_?)$ |
| $C(T_k)$ |

| Co-occurrence ratio |
| --- |
| $C(P(X)_i^j \cap Tk) / C(Tk)$ |
| $C(P_i^j Tk)$ |
| $C(P(X)_i^j \cap T_1) / C(T_1)$ |
| $C(P(X)_i^j \cap T_?) / C(T_?)$ |
| $C(P(X)_i^j \cap T_?) / C(T_?)$ |
| $C(P(X)_i^j \cap T_k) / C(T_k)$ |

MATRIX OF CO-OCCURRENCES RATIOS FOR PREDICTOR ($P_i$)

| Predictor values:1-j<br>Target values<br>:<br>1-k | $P_i^1$ | $P_i^?$ | $P_i^?$ | $P_i^j$ |
|---|---|---|---|---|
| | $C(P_i^1 T_k)$ | $C(P_i^? T_k)$ | $C(P_i^? T_k)$ | $C(P_i^j T_k)$ |
| $T_1$ | $C(P(X_i^1) \cap T_1)/C(T_1)$ | $C(P(X_i^?) \cap T_1)/C(T_1)$ | $C(P(X_i^?) \cap T_1)/C(T_1)$ | $C(P(X_i^j) \cap T_1)/C(T_1)$ |
| $T_?$ | $C(P(X_i^1) \cap T_?)/C(T_?)$ | $C(P(X_i^?) \cap T_?)/C(T_?)$ | $C(P(X_i^?) \cap T_?)/C(T_?)$ | $C(P(X_i^j) \cap T_?)/C(T_?)$ |
| $T_?$ | $C(P(X_i^1) \cap T_?)/C(T_?)$ | $C(P(X_i^?) \cap T_?)/C(T_?)$ | $C(P(X_i^?) \cap T_?)/C(T_?)$ | $C(P(X_i^j) \cap T_?)/C(T_?)$ |
| $T_k$ | $C(P(X_i^1) \cap T_1)/C(T_k)$ | $C(P(X_i^?) \cap T_1)/C(T_k)$ | $C(P(X_i^?) \cap T_1)/C(T_k)$ | $C(P(X_i^j) \cap T_1)/C(T_k)$ |

412

VARIANCE OF PREDICTOR (PI) = SI =VARIANCE OF ALL THE ELEMENTS IN THE CO-OCCURANCE MATRIX FOR PREDICTOR(PI)

DATA MINING MODEL BUILDING USING ATTRIBUTE IMPORTANCE

CROSS-REFERENCE TO RELATED APPLICATIONS

The benefit of provisional application No. 60/379,104, filed May 10, 2002, under 35 U.S.C. § 119(e), is hereby claimed.

FIELD OF THE INVENTION

The present invention relates to a system, method, and computer program product that selects a subset of the original predictor attributes in a dataset to be used to build a data mining model by eliminating redundant, irrelevant or uninformative predictor attributes and identifying those predictor attributes that may be most helpful in making predictions.

BACKGROUND OF THE INVENTION

Data mining is a technique by which hidden patterns may be found in a group of data. True data mining doesn't just change the presentation of data, but actually discovers previously unknown relationships among the data. Data mining is typically implemented as software in or in association with database systems. Data mining includes several major steps. First, data mining models are generated based on one or more data analysis algorithms. Initially, the models are "untrained", but are "trained" by processing training data and generating information that defines the model. The generated information is then deployed for use in data mining, for example, by providing predictions of future behavior or recommendations for actions to be taken based on specific past behavior.

A Data Mining System (DMS) examines data and constructs models that express predictions about subsequent data. The time and computation resources required to build these models increases with the size of the predictors in the transactional data set, i.e. the number of rows and attributes in the data. Relatively recently developed sources of data used for data mining, such as Internet click streams and Enterprise-wide data collection, produce vast quantities (rows) of data and contain very large numbers of attributes. This causes the time required to build models based on such data to be excessive and the computation resources needed to be very expensive. A need arises for a technique by which the time and computation resources required to build data mining models can be reduced, which would provide a corresponding reduction in the cost of data mining.

SUMMARY OF THE INVENTION

The present invention is a system, method, and computer program product that uses attribute importance (AI) to reduce the time and computation resources required to build data mining models, and which provides a corresponding reduction in the cost of data mining. Attribute importance (AI) involves a process of choosing a subset of the original predictive attributes by eliminating redundant, irrelevant or uninformative ones and identifying those predictor attributes that may be most helpful in making predictions. If a subset of the original predictive attributes are selected, model building can proceed using the selected attributes (predictor attributes) only. This decreases the model building time and the required computation resources.

In one embodiment of the present invention, a method of selecting predictive attributes for a data mining model comprises the steps of receiving a dataset having a plurality of predictor attributes, for each predictor attribute, determining a predictive quality of the predictor attribute, selecting at least one predictor attribute based on the determined predictive quality of the predictor attribute, and building a data mining model including only the selected at least one predictor attribute. The step of determining a predictive quality of the predictor attribute may comprise the steps of determining a predictive quality of the predictor attribute using an attribute importance algorithm. The attribute importance algorithm may comprise a predictor variance algorithm operable to select predictor attributes based on estimates of variances of predictor/target combinations and variance with respect to other predictors, and a selection criteria algorithm operable to select predictor attributes based on a combination of search and evaluation measures of the predictor attributes.

In one aspect of the present invention, the attribute importance algorithm may comprise the step of selecting predictor attributes based on selection criteria using a combination of search and evaluation measures of the predictor attributes. The attribute importance algorithm may comprise the steps of ranking the predictor attributes according to evaluation criteria and selecting a minimum set of predictor attributes that satisfies the evaluation criteria. The step of ranking the predictor attributes according to evaluation criteria may comprise the steps of associating each predictor attribute with a rank based on the evaluation criteria and forming a result set comprising the predictor attribute, a value of the predictor attribute, and the rank of the predictor attribute. The step of selecting a minimum set of predictor attributes that satisfies the evaluation criteria may comprise the step of selecting a minimum set of predictor attributes that satisfies the evaluation criteria using the result set. The step of associating each predictor attribute with a rank based on the evaluation criteria may comprise the step of ranking each predictor attribute according to at least one of accuracy, consistency, information, distance, dependence, relevance, and importance of the attribute compared to other attributes. The step of associating each predictor attribute with a rank based on the evaluation criteria may comprise the step of ranking each predictor attribute using Predictor Variance algorithm.

In one aspect of the present invention, the attribute importance algorithm may comprise the step of selecting predictor attributes based on estimates of variances of predictor/target combinations and variance with respect to other predictors. The step of determining a predictive quality of the predictor attribute may further comprise the step of selecting predictor attributes based on selection criteria using a combination of search and evaluation measures of the predictor attributes. The step of determining a predictive quality of the predictor attribute may comprise the step of determining a predictor variance PV according to:

$$PV(P_a) = \sum_{i,k=1}^{m,n}\left(\left(\frac{P_iT_k}{T_k} - \frac{1}{mn}\sum_{j,q=1}^{n,n}\frac{P_jT_q}{T_q}\right)\right)^2 \Big/ n\sum_{i=1}^{m}\left(P_i - \frac{1}{m}\sum_{j=1}^{n}P_j\right)^2,$$

wherein P is the predictor and T is the target, P has values 1 . . . m, and T has values 1 . . . n. The step of determining a predictive quality of the predictor attribute may comprise the steps of determining a variance Q of all predictors ignoring a predictor $P_a$ according to:

$$Q_a = \frac{1}{m-1}\left(\sum_{i=1|i!=a}^{m-1}\left(P_i - \frac{1}{m-1}\sum_{j=1}^{m-1} P_j\right)^2\right); \text{ and}$$

determining a predictor variance PV according to:

$$PV(P_a) = \sum_{i,k=1}^{m,n}\left(\frac{P_i T_k}{T_k} - \frac{1}{mnQ_a}\sum_{j,q=1}^{n,n}\frac{P_j T_q}{T_q}\right)^2 \Bigg/ n\sum_{i=1}^{m}\left(P_i - \frac{1}{m}\sum_{j=1}^{n} P_j\right)^2,$$

wherein P is the predictor and T is the target, P has values 1 . . . m, and T has values 1 . . . n.

BRIEF DESCRIPTION OF THE DRAWINGS

The details of the present invention, both as to its structure and operation, can best be understood by referring to the accompanying drawings, in which like reference numbers and designations refer to like elements.

FIG. 4*a* is an exemplary data structure in which a predictor attribute set may be stored.

FIG. 4*b* is an exemplary data structure in which a predictor attribute set may be stored.

FIG. 4*c* is an exemplary data structure in which target values may be stored.

FIG. 4*d* is an exemplary data structure in which a co-occurrence counts of predictor attributes may be stored.

FIG. 4*e* is an exemplary data structure in which a vector of target apriori counts may be stored.

FIG. 4*f* is an exemplary data structure in which correlation of predictor attributes may be stored.

FIG. 4*g* is an exemplary data structure in which a variance of the co-occurrence ratio matrix may be stored.

DETAILED DESCRIPTION OF THE INVENTION

Attribute importance (AI) is the process of choosing a subset of the original predictive attributes by eliminating redundant, irrelevant or uninformative ones and identifying those predictor attributes that may be most helpful in making predictions. The Data Mining System (DMS) examines data and constructs models that express predictions about subsequent data. The time required to build these models increases with the size of the predictors in the transactional data set i.e. number of rows and attributes in the data. If a subset of the original predictive attributes are selected, model building can proceed using the selected attributes (predictor attributes) only. This decreases the model building time, although sometimes at a cost in predictive accuracy. Also, presence of extra attributes, which might sometimes be noise, affects the model and degrades the performance. By extracting as much information as possible from a given data set while using the smallest number of attributes, we can save significant computing time and often build models that generalize better to unseen points.

Attribute importance is applicable in data mining for text mining, medical applications, web mining, and database marketing. Attribute importance has traditionally been studied in supervised learning situations, with some estimate of accuracy used to evaluate candidate subsets. Attribute importance in supervised learning could be applied to any large marketing problem. In an increasingly competitive marketplace, it is critical to acquire, retain, and increase the profitability based on information about customers and profiles. One of the most interesting problems in database marketing is how to identify and profile customers or prospects who are most likely to respond to some market advertising. At the same time, minimizing the number of variables used in prediction task becomes more important with the growing size of the database. Identifying the important attributes will help in minimizing the data collection effort and reduce the database size. The immediate beneficiary is the application programmer integrating data mining into an existing application—the time for testing defined models will be reduced considerably. In the long run, as data mining is exposed in a user interface and multiple methodologies are available, this facility will allow for the data mining user to test many models in less time before deciding upon a "best" model.

Figure 1:
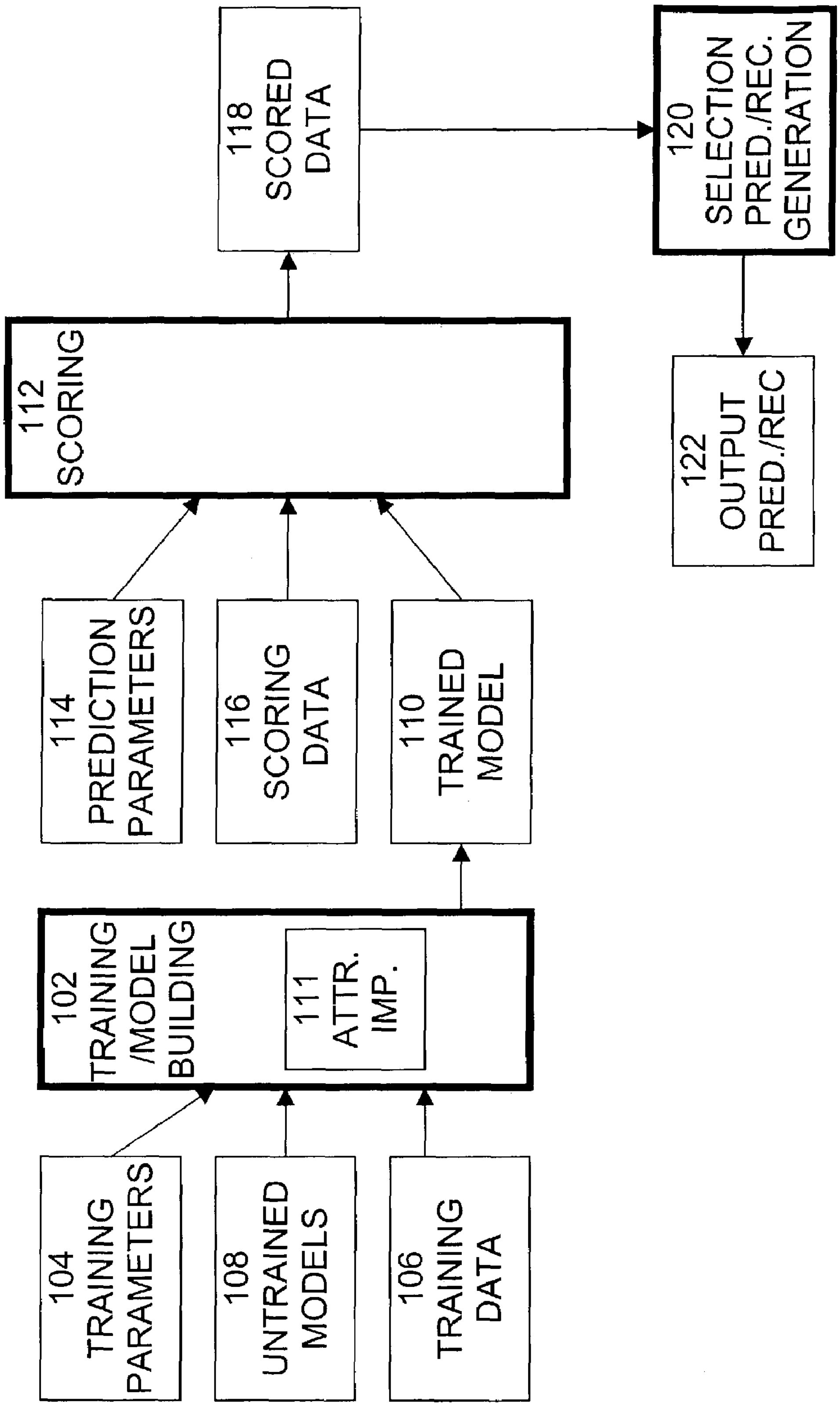
FIG. 1 is an exemplary data flow diagram of a data mining process, including the use of attribute importance according to the present invention.

An exemplary data flow diagram of a data mining process, including the use of attribute importance, is shown in FIG. 1. The training/model building step 102 involves generating the models that are used to perform data mining recommendation and prediction. The inputs to training/model building step 102 include training parameters 104, training data 106, and untrained models 108. Untrained models 108 include algorithms that process the training data 106 in order to actually build the models. Training parameters 104 are parameters that are input to the data-mining model building algorithms to control how the algorithms build the models. Training data 106 is data that is input to the algorithms and which is used to actually build the models.

Training/model building step 102 invokes the data mining model building algorithms included in untrained models 108, initializes the algorithms using the training parameters 104, processes training data 106 using the algorithms to build the model, and generates trained model 110. Trained model 110 may also be evaluated and adjusted in order to improve the quality, i.e. prediction accuracy, of the model. Likewise, attribute importance processing 111 is applied to select a subset of the original predictive attributes by eliminating redundant, irrelevant or uninformative ones and identifying those predictor attributes that may be most helpful in making predictions. Trained model 110 is then encoded in an appropriate format and deployed for use in making predictions or recommendations.

Scoring step 112 involves using the deployed trained model 110 to make predictions or recommendations based on new data that is received. Trained model 110, prediction parameters 114, and prediction data 116 are input to scoring step 112. Trained models 110 include information defining the model that was generated by model building step 102. Prediction parameters 114 are parameters that are input to the scoring step 118 to control the scoring of scoring data 116 against trained model 110 and are input to the selection and prediction/recommendation step 120 to control the selection of the scored data and the generation of predictions and recommendations.

Scoring data 116 is processed according to trained model 110, as controlled by prediction parameters 114, to generate one or more scores for each row of data in scoring data 116. The scores for each row of data indicate how closely the row of data matches attributes of the model, how much confidence may be placed in the prediction, how likely each output prediction/recommendation is to be true, and other statistical indicators. Scored data 118 is output from scoring step 112 and includes predictions or recommendations, along with corresponding probabilities for the scored data.

Scored data 118 is input to selection and prediction/recommendation generation step, which evaluates the probabilities associated with the predictions/recommendations and selects at least a portion of the predictions/recommendations. The selected predictions/recommendations are those having probabilities meeting the selection criteria. The selection criteria may be defined by desired results data and/or by predefined or default criteria included in selection/generation step 120. In addition, the selection criteria may include a limit on the number of predictions/recommendations that are to be selected, or may indicate that the predictions/recommendations are to be sorted based on their associated probabilities. The selected predictions/recommendations are output 122 from step 120 for use in data mining.

Figure 2:
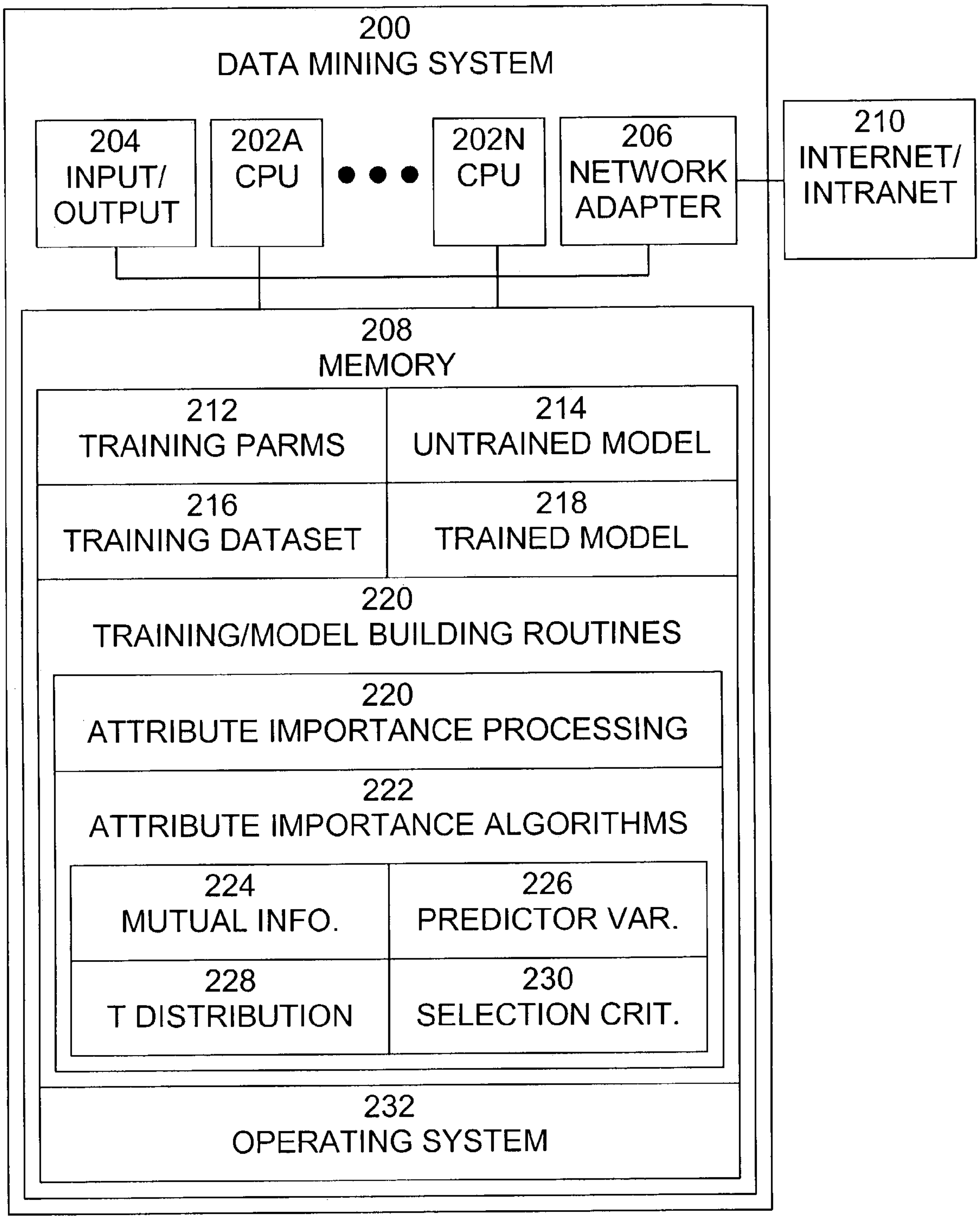
FIG. 2 is an exemplary block diagram of a data mining system, in which the present invention may be implemented.

An exemplary block diagram of a data mining system 200, in which the present invention may be implemented, is shown in FIG. 2. System 200 is typically a programmed general-purpose computer system, such as a personal computer, workstation, server system, and minicomputer or mainframe computer. System 200 includes one or more processors (CPUs) 202A–202N, input/output circuitry 204, network adapter 206, and memory 208. CPUs 202A–202N execute program instructions in order to carry out the functions of the present invention. Typically, CPUs 202A–202N are one or more microprocessors, such as an INTEL PENTIUM® processor. FIG. 2 illustrates an embodiment in which system 200 is implemented as a single multi-processor computer system, in which multiple processors 202A–202N share system resources, such as memory 208, input/output circuitry 204, and network adapter 206. However, the present invention also contemplates embodiments in which system 200 is implemented as a plurality of networked computer systems, which may be single-processor computer systems, multi-processor computer systems, or a mix thereof.

Input/output circuitry 204 provides the capability to input data to, or output data from, system 200. For example, input/output circuitry may include input devices, such as keyboards, mice, touchpads, trackballs, scanners, etc., output devices, such as video adapters, monitors, printers, etc., and input/output devices, such as, modems, etc. Network adapter 206 interfaces system 200 with Internet/intranet 210. Internet/intranet 210 may include one or more standard local area network (LAN) or wide area network (WAN), such as Ethernet, Token Ring, the Internet, or a private or proprietary LAN/WAN.

Memory 208 stores program instructions that are executed by, and data that are used and processed by, CPU 202 to perform the functions of system 200. Memory 208 may include electronic memory devices, such as random-access memory (RAM), read-only memory (ROM), programmable read-only memory (PROM), electrically erasable programmable read-only memory (EEPROM), flash memory, etc., and electromechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

In the example shown in FIG. 2, memory 208 includes training parameters 104, untrained models 108, training dataset 106, trained model 110, training/model building routines 220, which includes attribute importance processing routines 220 and attribute importance algorithms, such as mutual information algorithm 224, predictor variance algorithm 226, t distribution algorithm 228, selection criteria algorithm 230, and operating system 232. Training parameters 104 are parameters that are input to the data-mining model building algorithms to control how the algorithms build the models. Untrained model 108 includes one or more untrained Naïve Bayes models that are used to build the models. Training dataset 106 includes data that is input to the algorithms and which is used to actually build the models. Trained model 110 includes representations of the Naïve Bayes model that are used to score data. Attribute importance processing routines control and perform the selection of predictive attributes to be included in trained model 110. Attribute importance algorithms 222 apply one or more specific algorithms that determine the predictive quality of the attributes and effect the selection of predictive attributes to be included in trained model 110. Mutual information algorithm 224 selects attributes that are relevant to each other and conditionally independent with each other. Predictor variance algorithm 226 selects predictors based on estimates of the variances of the predictor/target combinations and the variance with respect to the other predictors. T distribution algorithm 228 selects predictors based on a probability distribution. Selection criteria algorithm 230 selects predictors based on a combination of search and evaluation measures of the attributes, such as ranking algorithms and minimum subset algorithms. Operating system 232 provides underlying system functionality.

Although examples of attribute importance algorithms are described, one of skill in the art would recognize that other attribute importance algorithms may also be advantageously employed and that the present invention contemplates any and all such other attribute importance algorithms.

As shown in FIG. 2, the present invention contemplates implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including UNIX®, OS/2®, and WINDOWS®, are capable of running many tasks at the same time and are called multitasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

Figure 3:
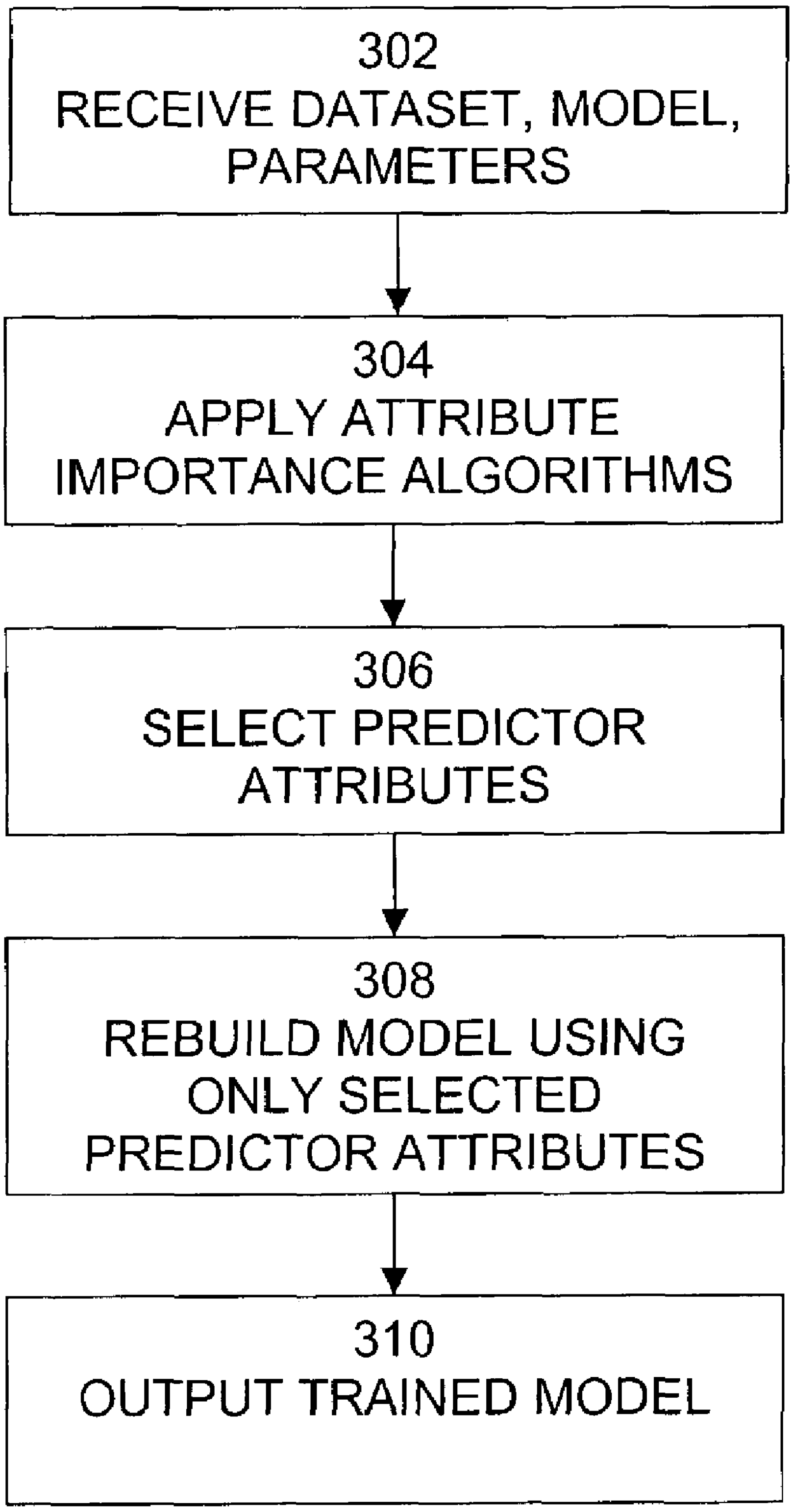
FIG. 3 is a flow diagram of a process of attribute importance processing of a data mining model, according to the present invention.

A flow diagram of a process 300 of attribute importance processing of a data mining model is shown in FIG. 3. It is best viewed in conjunction with FIGS. 1 and 2. Process 300 begins with step 302, in which training parameters 104, untrained data mining model 108, and training dataset 106 are received and/or specified. Untrained data mining model 108 includes algorithms that process the training data 106 in order to actually build the model. Training parameters 104 are parameters that are input to the data-mining model building algorithms to control how the algorithms build the models. Training data 106 is data that is input to the algorithms and which is used to actually build the models.

In step 304, one or more attribute importance algorithms are applied to determine the predictive quality of the predictor attributes included in training data 106. In step 306, those predictor attributes that have been determined to have acceptable predictive quality are selected for inclusion in the trained model. In step 308, the data mining model building algorithms included in untrained data mining model 108 are invoked by training/model building routines 220. The algorithms are initialized using the training parameters 104, training data 106 is processed using the algorithms to build the model, and trained model 110 is generated and incorporates only the selected predictor attributes. In step 310, trained model 110 is output and deployed for use in data mining.

The algorithm used to select the model attributes that are to be used is usually specific to the type of problem to be solved: improve accuracy or improve computational efficiency. Some algorithms concentrate on enhancing the computational efficiency of the classifiers, while others are more focused on improving the accuracy. The other differential factor in the selection of the algorithm for attribute importance is the selection criteria used for selecting the important attributes.

There exist many possible techniques for selecting the model attributes that are to be used, including clustering and statistical metrics. In practice, weak correlations between the predictors and the target usually mean that the problem is hard and that the classifier will have to do real work to predict better than chance. As the requirements change from dataset to dataset and algorithm to algorithm the goal is to cover most of the cases of practical value. For example, in one embodiment, the present invention may provide a generic method that is relatively fast. As another example, the present invention may provide attribute importance algorithms based on information theory, algorithm-based wrappers and statistical algorithms and also algorithms that work on unsupervised models.

Some data mining algorithms benefit more from attribute importance than do other algorithms. Optimal attribute importance is a NP-complete problem so for most datasets of realistic sizes one has to accept approximations. The goal is to reduce the number of active fields used for the build. A data mining system needs the ability to select and use only those columns that are valuable to the data mining process. This is not Sensitivity Analysis, which ranks the field importance for a given model.

Attribute importance using Predictor Variance may provide a number of important advantages, including:

Increase the accuracy of the supervised models by eliminating noise.

Reduce Model Building time by reducing the number of predictors used for build and apply.

Provide an efficient AI algorithm that can be used on both numeric and categorical attributes.

Provide a ranking criterion for selecting the top attributes.

Attribute Importance for Improving Classification Models

Attribute importance provides an automated solution for improving the speed and accuracy of the classification models on datasets with large numbers of attributes. The challenge is finding the attributes that produce an accurate classification model. In a dataset with large numbers of attributes, most of the attributes may be redundant, or irrelevant. Presence of such extra attributes affects the accuracy of the model and degrades the performance. The attribute importance processing of the present invention uses the predictor and target apriori statistics to assess the relative usefulness of each attribute for making predictions for rows in general, rather than to make a prediction for any particular row. In particular, for each attribute n, for each possible value i, and for each possible value k of the target attribute, attribute importance computes the statistics to assign a value that determines the importance of that attribute for predicting the behavior of the data set. These statistics give an idea of how correlated each attribute is with the target attribute. The more correlated a predictor attribute is with the target attribute, the more useful attribute importance deems it. Since a single target problem is addressed, attribute importance need not take account of correlations that are due to a combination of several non-target attributes' values, and which may not be evident when considering any single non-target attribute individually.

Finding a predictive subset of input variables is an important problem in its own right. It is domain and data dependent. Presence of extra attributes might be important for some scientific goals but it decreases the accuracy of some classification problems and instance-based learning methods. Attribute importance is also used as a traditional approach for learning Bayesian-Networks. The benefits of having a simpler Bayesian Network can outweigh the slight reduction in prediction accuracy and the one-time cost incurred during the network-construction, especially in cases where the network generated using the entire set of attributes may be too large to even allow inference. Attribute importance can be used in conjunction with any of the supervised data mining algorithms. The mathematical programming methods of attribute importance define this as the method of discrimination between two given sets in an n-dimensional attributes space by using as few of the given attributes as possible.

The algorithm used for the attribute importance is determined by the goals of the attribute importance. Most of the traditional algorithms concentrate on enhancing the computational efficiency of the classifiers, while a few are more focused on improving the accuracy. The other differential factor in the selection of the algorithm for attribute importance is the selection criteria used for selecting the important attributes.

Attribute Importance Algorithms

The attribute importance algorithms are characterized by the methodology of attribute search, filtering etc. Some of them include heuristic searches, filtering attributes or treating attribute importance as a wrapper around the induction process. The wrapper methods are based on the classifier's error rate. The filter algorithms use evaluation metrics based on distance, information etc. Some algorithms use domain language to prune the attributes. But in the traditional market basket scenario it is important to find an optimal subset of attributes without the domain knowledge. One approach is to use a classic greedy algorithm called sequential Backward Selection (SBS). In this approach each attribute is removed one at a time until no improvement of the criteria function is reached. But in this approach the criteria function is problem specific and can vary from simple performance to complex evaluation procedure. Attribute importance focuses on choosing an algorithm, which is problem independent and can be applicable to any kind of data. Although the predictor variance algorithm is preferred, other algorithms, such as mutual information and the t distribution may also be suitable.

Predictor Variance

The predictor variance approach estimates the variances of the predictor target combinations and the variance with respect to the other predictors. The idea behind this is the higher the sum of the variances the more informative the predictor attribute is in the training set. These statistics give an idea of how correlated each predictor is with the target column. Predictor variance assesses the relative usefulness of each column for making predictions for rows in general, rather than to make a prediction for any particular row.

The predictor variance is computed using the predictor and target supports in the data set. In particular, for each column n, for each possible value i, and for each possible value k of the target column, we tabulate P(column-n-has—value-i | target-column-has-value-k), where P means "probability of" and "|" means "given that". Further the variance of the predictors gives the correlation of each predictor with respect to other predictors is computed. These statistics give an idea of how influential each predictor is with the target column. The higher predictor variance a predictor has, the more useful attribute importance deems it.

Assume P is a predictor and T is a target. Let P have values 1 . . . m, and T has values 1 . . . n. The predictor variance of a predictor $P_a$ is:

$$PV(P_a) = \sum_{i,k=1}^{m,n}\left(\left(\frac{P_iT_k}{T_k} - \frac{1}{mn}\sum_{j,q=1}^{n,n}\frac{P_jT_q}{T_q}\right)\right)^2 \Big/ n\sum_{i=1}^{m}\left(P_i - \frac{1}{m}\sum_{j=1}^{n}P_j\right)^2.$$

In order to account for correlations that are due to a combination of several predictor columns the algorithm can be further enhanced by taking into account the variance of other predictors in evaluating the Predictor Variance for a predictor $P_a$.

Let Q is the variance of all predictors ignoring the predictor $P_a$.

$$Q_a = \frac{1}{m-1}\left(\sum_{i=1|i!=a}^{m-1}\left(P_i - \frac{1}{m-1}\sum_{j=1}^{m-1}P_j\right)^2\right).$$

The predictor variance for $P_a$ in this case is:

$$PV(P_a) = \sum_{i,k=1}^{m,n}\left(\frac{P_iT_k}{T_k} - \frac{1}{mnQ_a}\sum_{j,q=1}^{n,n}\frac{P_jT_q}{T_q}\right)^2 \Big/ n\sum_{i=1}^{m}\left(P_i - \frac{1}{m}\sum_{j=1}^{n}P_j\right)^2$$

The predictor variance is computed using the predictor and target supports in the transactional data set.

Examples of data structures that may be used to perform the predictor variance algorithm are shown in FIGS. 4*a*–4*g*.

Let P be the Predictor Attribute Set, stored in data structure 402, shown in FIG. 4*a*, consisting of attributes p and i, where p consists of j distinct values, and i consists of n distinct values.

Predictors P={$p_1$ . . . ,$p_j$, . . . $i_1$, . . . $i_j$, . . . $i_n$}

Let t be the target with k distinct values.

Target T={$t_1$ . . . $t_k$}

For each predictor i, for each possible value j of predictor i, stored in data structure 404, shown in FIG. 4*b*, and for each possible value k of the target column, stored in data structure 406, shown in FIG. 4*c*, compute the vector of the counts of co-occurrences of predictor-i-has-value-i and that target-has-value-k, stored in data structure 408, shown in FIG. 4*d*. These statistics give an idea of how correlated each predictor is with the target column. The vector of target apriori counts of the targets for each value k, stored in data structure 410, shown in FIG. 4*e*, gives the weight of each target value. The ratio of the co-occurrence count for each predictor i of value j and the apriori count, stored in data structure 412, shown in FIG. 4*f*, gives the correlation of each predictor i of value j with the target of value k. The variance of the co-occurrence ratio matrix 414, shown in FIG. 4*g*, for all the predictors indicates the order of the important attributes in terms of correlation. The top n attributes with the highest variance are the important attributes.

Vector of Co-occurrences of Predictor P and Target T={C($i_1 \cap t_1$), C($i_1 \cap t_2$), . . . , C($i_j \cap t_1$), . . . C($i_1 \cap t_k$)}

Vector of Apriori counts of Target $t_k$={C($t_1$), . . . , C($t_k$)}

Vector of ratio of co-occurrences for Predictor I value j={(C($_{ij} \cap t_1$)/C($t_1$),), . . . ,(C($i_j \cap t_k$)/C($t_k$)}

Matrix of ratio of co-occurrences for Predictor I={(C($i_1 \cap t_1$)/C($t_1$),), . . . , (C($i_1 \cap t_k$)/C($t_k$)

. . .

(C($i_j \cap t_1$)/C($t_1$),), . . . , (C($_{ij} \cap t_k$)/C($t_k$)}

Variance of co-occurrence matrix=

$$\sigma^2 = \Sigma(x_i - \mu)^2/N$$

where $x_1$ is the element in co-occurrence matrix $\mu$ is the co-occurrence mean for predictor i N is the population size of the co-occurrence matrix The top n Predictors with the highest variance are selected as the important attributes. If there is a 100% confidence between predictors of value i and target j, then the diagonal of the correlation matrix will consist of one's and all the other elements of the matrix are zero.

Mutual Information

When there are many noisy attributes and dependent information attributes mutual information might be preferable. This algorithm selects attributes relevant to each other and conditionally independent with each other.

The mutual information I(X|Y) is defined to be the difference of entropy on X generated by the knowledge of Y:

$$I(X|Y) = H(X) - H(X|Y)$$

Suppose that, in a data set, there are n Classes C and the attribute vector X has m dimensions, which can take q values each, therefore X can take $q^m$ values $x_j$. Then I(C|X)=H(C)−H(C|X) is equal to:

$$I(C \mid X) = -\sum_{i=1}^{n} \sum_{j=1}^{q^m} p(x_j \mid C_i) p(C_i) \log\left[\frac{p(x_j \mid C_i)}{p(x_j)}\right].$$

t distribution

The t distribution is a probability distribution. When the sample size is small and the standard deviation of the population is unknown, the shape of the distribution of sample means (i.e. s) may not be approximately normal—it depends upon the shape of the population distribution. The area under any one of the curves and above the t-axis will always be 1. If we have a normal distribution, and we know the mean, and can estimate the standard deviation from the data and we can calculate the t distribution. The t curve is a family of curves indexed by a parameter called the degrees of freedom, which can take the values 1, 2, . . . n. The t curve is used to approximate some probability histograms. Consider a population of numbers that are nearly normally distributed and have population mean is μ. With a random sample of size n with replacement from the population, and computing the sample mean M and the sample standard deviation S, we have:

$$t = \frac{(M - \mu)}{s\sqrt{v}}, \text{ and}$$

$$s^2 = \sum_{l-1}^{n} \left( \frac{(x^l - x)^2}{n - 1} \right).$$

The t curve can be used to test hypotheses about the population mean and construct confidence intervals for the population mean, when the population distribution is known to be nearly normally distributed.

This test is associated, for example, with the hypothesis that the values of a given attribute, when separated according to the target values, come from two different probability distributions with different means. From a Bayesian perspective this T-test is a simplified version of an estimate the Bayes error (area under the overlap of the distributions) of each attribute seen as a single predictor.

Selection Criteria for Attribute Importance.

Selection Criteria in attribute importance are generally determined by the combination of search and evaluation measures of the attributes. One category is about ranking attributes according to some evaluation criteria and the other is about choosing a minimum set of attributes that satisfies specified evaluation criteria. Below is a high level abstraction of the two common selection criteria used for attribute importance. Each attribute is associated with certain rank, and the attribute, value and the rank together form the result set for the ranking selection and attribute, value form the result set for minimum subset selection.

Ranking Algorithms

Using the ranking algorithm the stopping criteria is the threshold that determines the subset of attributes. There are various algorithms for ranking according to accuracy, consistency, information, distance, or dependence. The ranking algorithms determine the relevance and importance of that attribute compared to other attributes.

Few measures of ranking the attributes are using Information Gain (Qunila), Distance Measure and Bhattacharya's Dependence Measure. The worst case complexity of these algorithm is O(N2) where N is the number of attributes. The main conceptual challenge in such algorithms is determining the threshold t, where the first t are the chosen attributes in an ordered list of ranked attributes. Information gain is applied only to discrete attributes. For continuous attributes a split point is found with highest gain among the sorted values to split into two segments.

The common attribute among all the mentioned algorithms in each individual attribute is evaluated with a measure expressed as a value. The attributes are sorted according to this evaluation value.

Minimum Subset Algorithms

The Minimum Subset Algorithms return a subset of attributes and the attributes in this subset are not differentiated from each other. If an attribute is in this subset it is termed as a relevant attribute otherwise an irrelevant attribute. The algorithms are classified based on the generation schemes and the evaluation measures. The idea behind such algorithms is by selecting the best or removing the worst attribute sequentially starting from the null set or a complete set respectively, an absolute minimal set will emerge. The criteria for having efficient minimum subset algorithms are we have a search space of 2N where N is the number of attributes.

What is claimed is:

1. A method of selecting predictive attributes for a data mining model comprising the steps of:

receiving a dataset having a plurality of predictor attributes;

for each predictor attribute, determining a predictive quality of the predictor attribute based on a predictor variance of the predictor attribute;

selecting at least one predictor attribute based on the determined predictive quality of the predictor attribute; and building a data mining model in a computer readable medium including only the selected at least one predictor attribute.

2. The system of claim 1, wherein the step of determining a predictive quality of the predictor attribute comprises the steps of:

determining a predictive quality of the predictor attribute using an attribute importance algorithm.

3. The system of claim 2, wherein the attribute importance algorithm comprises:

a predictor variance algorithm operable to select predictor attributes based on estimates of variances of predictor/target combinations and variance with respect to other predictors; and a selection criteria algorithm operable to select predictor attributes based on a combination of search and evaluation measures of the predictor attributes.

4. The system of claim 2, wherein the attribute importance algorithm comprises the step of:

selecting predictor attributes based on selection criteria using a combination of search and evaluation measures of the predictor attributes.

5. The system of claim 2, wherein the attribute importance algorithm comprises the steps of:

ranking the predictor attributes according to evaluation criteria; and selecting a minimum set of predictor attributes that satisfies the evaluation criteria.

6. The method of claim 4, wherein the step of ranking the predictor attributes according to evaluation criteria comprises the steps of:

associating each predictor attribute with a rank based on the evaluation criteria; and forming a result set comprising the predictor attribute, a value of the predictor attribute, and the rank of the predictor attribute.

7. The method of claim 5, wherein the step of selecting a minimum set of predictor attributes that satisfies the evaluation criteria comprises the step of:

selecting a minimum set of predictor attributes that satisfies the evaluation criteria using the result set.

8. The method of claim 6, wherein the step of associating each predictor attribute with a rank based on the evaluation criteria comprises the step of:

ranking each predictor attribute according to at least one of accuracy, consistency, information, distance, dependence, relevance, and importance of the attribute compared to other attributes.

9. The method of claim 6, wherein the step of associating each predictor attribute with a rank based on the evaluation criteria comprises the step of:

ranking each predictor attribute using Predictor Variance algorithm.

10. The method of claim 2, wherein the attribute importance algorithm comprises the step of:

selecting predictor attributes based on estimates of variances of predictor/target combinations and variance with respect to other predictors.

11. The method of claim 1, wherein the step of determining a predictive quality of the predictor attribute comprises the step of:

selecting predictor attributes using a predictor variance algorithm based on estimates of variances of predictor/target combinations and variance with respect to other predictors.

12. The method of claim 11, wherein the step of determining a predictive quality of the predictor attribute further comprises the step of:

selecting predictor attributes based on selection criteria using a combination of search and evaluation measures of the predictor attributes.

13. The method of claim 11, wherein the step of determining a predictive quality of the predictor attribute comprises the step of:

determining a predictor variance PV according to:

$$PV(P_a) = \sum_{i,k=1}^{m,n}\left(\left(\frac{P_iT_k}{T_k} - \frac{1}{mn}\sum_{j,q=1}^{m,n}\frac{P_jT_q}{T_q}\right)\right)^2 \bigg/ n\sum_{i=1}^{m}\left(P_i - \frac{1}{m}\sum_{j=1}^{m}P_j\right)^2,$$

wherein P is the predictor and T is the target, P has values 1 . . . m, and T has values 1 . . . n.

14. The method of claim 11, wherein the step of determining a predictive quality of the predictor attribute comprises the steps of:

determining a variance Q of all predictors ignoring a predictor $P_a$ according to:

$$Q_a = \frac{1}{m-1}\left(\sum_{i=1|i!=a}^{m-1}\left(P_i - \frac{1}{m-1}\sum_{j=1}^{m-1}P_j\right)^2\right); \text{ and}$$

determining a predictor variance PV according to:

$$PV(P_a) = \sum_{i,k=1}^{m,n}\left(\frac{P_iT_k}{T_k} - \frac{1}{mnQ_a}\sum_{j,q=1}^{m,n}\frac{P_jT_q}{T_q}\right)^2 \bigg/ n\sum_{i=1}^{m}\left(P_i - \frac{1}{m}\sum_{j=1}^{m}P_j\right)^2,$$

wherein P is the predictor and T is the target, P has values 1 . . . m, and T has values 1 . . . n.

15. A system for selecting predictive attributes for a data mining model comprising:

a processor operable to execute computer program instructions;

a memory operable to store computer program instructions executable by the processor; and computer program instructions stored in the memory and executable to perform the steps of:

receiving a dataset having a plurality of predictor attributes;

for each predictor attribute, determining a predictive quality of the predictor attribute based on a predictor variance of the predictor attribute;

selecting at least one predictor attribute based on the determined predictive quality of the predictor attribute; and building a data mining model including only the selected at least one predictor attribute.

16. The system of claim 15, wherein the step of determining a predictive quality of the predictor attribute comprises the steps of:

determining a predictive quality of the predictor attribute using an attribute importance algorithm.

17. The system of claim 16, wherein the attribute importance algorithm comprises:

a predictor variance algorithm operable to select predictor attributes based on estimates of variances of predictor/target combinations and variance with respect to other predictors; and a selection criteria algorithm operable to select predictor attributes based on a combination of search and evaluation measures of the predictor attributes.

18. The system of claim 16, wherein the attribute importance algorithm comprises the step of:

selecting predictor attributes based on selection criteria using a combination of search and evaluation measures of the predictor attributes.

19. The system of claim 16, wherein the attribute importance algorithm comprises the steps of:

ranking the predictor attributes according to evaluation criteria; and selecting a minimum set of predictor attributes that satisfies the evaluation criteria.

20. The system of claim 19, wherein the step of ranking the predictor attributes according to evaluation criteria comprises the steps of:

associating each predictor attribute with a rank based on the evaluation criteria; and forming a result set comprising the predictor attribute, a value of the predictor attribute, and the rank of the predictor attribute.

21. The system of claim 20, wherein the step of selecting a minimum set of predictor attributes that satisfies the evaluation criteria comprises the step of:

selecting a minimum set of predictor attributes that satisfies the evaluation criteria using the result set.

22. The system of claim 21, wherein the step of associating each predictor attribute with a rank based on the evaluation criteria comprises the step of:

ranking each predictor attribute according to at least one of accuracy, consistency, information, distance, dependence, relevance, and importance of the attribute compared to other attributes.

23. The system of claim 22, wherein the step of associating each predictor attribute with a rank based on the evaluation criteria comprises the step of:

ranking each predictor attribute using at least one of Information Gain, Distance Measure, and Dependence Measure.

24. The system of claim 16, wherein the attribute importance algorithm comprises the step of:

selecting predictor attributes based on estimates of variances of predictor/target combinations and variance with respect to other predictors.

25. The system of claim 16, wherein the attribute importance algorithm comprises the steps of:

for each predictor attribute column n, for each possible value i, and for each possible value k of a target column, computing a probability of a column n having value i given that the target column has a value k; and selecting predictor attributes based on the computed probability.

26. The system of claim 15, wherein the step of determining a predictive quality of the predictor attribute comprises the step of:

selecting predictor attributes using a predictor variance algorithm based on estimates of variances of predictor/target combinations and variance with respect to other predictors.

27. The system of claim 26, wherein the step of determining a predictive quality of the predictor attribute further comprises the step of:

selecting predictor attributes based on selection criteria using a combination of search and evaluation measures of the predictor attributes.

28. The system of claim 26, wherein the step of determining a predictive quality of the predictor attribute comprises the step of:

determining a predictor variance PV according to:

$$PV(P_a) = \sum_{i,k=1}^{m,n}\left(\left(\frac{P_iT_k}{T_k} - \frac{1}{mn}\sum_{j,q=1}^{m,n}\frac{P_jT_q}{T_q}\right)\right)^2 \Big/ n\sum_{i=1}^{m}\left(P_i - \frac{1}{m}\sum_{j=1}^{m}P_j\right)^2,$$

wherein P is the predictor and T is the target, P has values 1 . . . m, and T has values 1 . . . n.

29. The system of claim 26, wherein the step of determining a predictive quality of the predictor attribute comprises the steps of:

determining a variance Q of all predictors ignoring a predictor $P_a$ according to:

$$Q_a = \frac{1}{m-1}\left(\sum_{i=1|i!=a}^{m-1}\left(P_i - \frac{1}{m-1}\sum_{j=1}^{m-1}P_j\right)^2\right);\text{ and}$$

determining a predictor variance PV according to:

$$PV(P_a) = \sum_{i,k=1}^{m,n}\left(\frac{P_iT_k}{T_k} - \frac{1}{mnQ_a}\sum_{j,q=1}^{m,n}\frac{P_jT_q}{T_q}\right)^2 \Big/ n\sum_{i=1}^{m}\left(P_i - \frac{1}{m}\sum_{j=1}^{m}P_j\right)^2,$$

wherein P is the predictor and T is the target, P has values 1 . . . m, and T has values 1 . . . n.

30. A computer program product for selecting predictive attributes for a data mining model, comprising:

a computer readable medium;

computer program instructions, recorded on the computer readable medium, executable by a processor, for performing the steps of receiving a dataset having a plurality of predictor attributes;

for each predictor attribute, determining a predictive quality of the predictor attribute based on a predictor variance of the predictor attribute;

selecting at least one predictor attribute based on the determined predictive quality of the predictor attribute; and building a data mining model including only the selected at least one predictor attribute.

31. The computer program product of claim 30, wherein the step of determining a predictive quality of the predictor attribute comprises the steps of:

determining a predictive quality of the predictor attribute using an attribute importance algorithm.

32. The computer program product of claim 31, wherein the attribute importance algorithm comprises:

a predictor variance algorithm operable to select predictor attributes based on estimates of variances of predictor/target combinations and variance with respect to other predictors; and a selection criteria algorithm operable to select predictor attributes based on a combination of search and evaluation measures of the predictor attributes.

33. The computer program product of claim 31, wherein the attribute importance algorithm comprises the step of:

selecting predictor attributes based on selection criteria using a combination of search and evaluation measures of the predictor attributes.

34. The computer program product of claim 31, wherein the attribute importance algorithm comprises the steps of:

ranking the predictor attributes according to evaluation criteria; and selecting a minimum set of predictor attributes that satisfies the evaluation criteria.

35. The computer program product of claim 34, wherein the step of ranking the predictor attributes according to evaluation criteria comprises the steps of:

associating each predictor attribute with a rank based on the evaluation criteria; and forming a result set comprising the predictor attribute, a value of the predictor attribute, and the rank of the predictor attribute.

36. The computer program product of claim 35, wherein the step of selecting a minimum set of predictor attributes that satisfies the evaluation criteria comprises the step of:

selecting a minimum set of predictor attributes that satisfies the evaluation criteria using the result set.

37. The computer program product of claim 36, wherein the step of associating each predictor attribute with a rank based on the evaluation criteria comprises the step of:

ranking each predictor attribute according to at least one of accuracy, consistency, information, distance, dependence, relevance, and importance of the attribute compared to other attributes.

38. The computer program product of claim 36, wherein the step of associating each predictor attribute with a rank based on the evaluation criteria comprises the step of:

ranking each predictor attribute using at least one of Information Gain, Distance Measure, and Dependence Measure.

39. The computer program product of claim 31, wherein the attribute importance algorithm comprises the step of:

selecting predictor attributes based on estimates of variances of predictor/target combinations and variance with respect to other predictors.

40. The computer program product of claim 31, wherein the attribute importance algorithm comprises the steps of:

for each predictor attribute column n, for each possible value i, and for each possible value k of a target column, computing a probability of a column n having value i given that the target column has a value k; and selecting predictor attributes based on the computed probability.

41. The computer program product of claim 30, wherein the step of determining a predictive quality of the predictor attribute comprises the step of:

selecting predictor attributes using a predictor variance algorithm based on estimates of variances of predictor/target combinations and variance with respect to other predictors.

42. The computer program product of claim 41, wherein the step of determining a predictive quality of the predictor attribute further comprises the step of:

selecting predictor attributes based on selection criteria using a combination of search and evaluation measures of the predictor attributes.

43. The computer program product of claim 41, wherein the step of determining a predictive quality of the predictor attribute comprises the step of:

determining a predictor variance PV according to:

$$PV(P_a) = \sum_{i,k=1}^{m,n}\left(\left(\frac{P_iT_k}{T_k} - \frac{1}{mn}\sum_{j,q=1}^{m,n}\frac{P_jT_q}{T_q}\right)\right)^2 \Big/ n\sum_{i=1}^{m}\left(P_i - \frac{1}{m}\sum_{j=1}^{m}P_j\right)^2,$$

wherein P is the predictor and T is the target, P has values 1 . . . m, and T has values 1 . . . n.

44. The computer program product of claim 41, wherein the step of determining a predictive quality of the predictor attribute comprises the steps of:

determining a variance Q of all predictors ignoring a predictor $P_a$ according to:

$$Q_a = \frac{1}{m-1}\left(\sum_{i=1|i!=a}^{m-1}\left(P_i - \frac{1}{m-1}\sum_{j=1}^{m-1}P_j\right)^2\right); \text{ and}$$

determining a predictor variance PV according to:

$$PV(P_a) = \sum_{i,k=1}^{m,n}\left(\left(\frac{P_iT_k}{T_k} - \frac{1}{mnQ_a}\sum_{j,q=1}^{m,n}\frac{P_jT_q}{T_q}\right)\right)^2 \Big/ n\sum_{i=1}^{m}P_i - \frac{1}{m}\sum_{i=1}^{m}\left(P_i - \frac{1}{m}\sum_{j=1}^{m}P_j\right)^2,$$

wherein P is the predictor and T is the target, P has values 1 . . . m, and T has values 1 . . . n.

45. A computer-implemented method of determining a predictive quality of a predictor attribute for a data mining model comprising the steps of:

receiving a dataset having a plurality of predictor attributes, wherein the predictor attributes are conditionally independent;

for each predictor attribute, determining a predictive quality of the predictor attribute by determining a predictor variance PV according to:

$$PV(P_a) = \sum_{i,k=1}^{m,n}\left(\left(\frac{P_iT_k}{T_k} - \frac{1}{mn}\sum_{j,q=1}^{m,n}\frac{P_jT_q}{T_q}\right)\right)^2 \Big/ n\sum_{i=1}^{m}P_i - \frac{1}{m}\sum_{i=1}^{m}\left(P_i - \frac{1}{m}\sum_{j=1}^{m}P_j\right)^2,$$

wherein P is the predictor and T is the target, P has values 1 . . . m, and T has values 1 . . . n;

storing the predictive quality of each predictor attribute in a computer readable medium.

46. A computer-implemented method of determining a predictive quality of a predictor attribute for a data mining model comprising the steps of:

receiving a dataset having a plurality of predictor attributes, wherein the predictor attributes have at least some inter-correlations;

for each predictor attribute, determining a predictive quality of the predictor attribute by determining a variance Q of all predictors ignoring a predictor $P_a$ according to:

$$Q_a = \frac{1}{m-1}\left(\sum_{i=1|i!=a}^{m-1}\left(P_i - \frac{1}{m-1}\sum_{j=1}^{m-1}P_j\right)^2\right); \text{ and}$$

determining a predictor variance PV according to:

$$PV(P_a) = \sum_{i,k=1}^{m,n}\left(\frac{P_iT_k}{T_k} - \frac{1}{mnQ_a}\sum_{j,q=1}^{m,n}\frac{P_jT_q}{T_q}\right)^2 \Big/ n\sum_{i=1}^{m}\left(P_i - \frac{1}{m}\sum_{j=1}^{m}P_j\right)^2,$$

wherein P is the predictor and T is the target, P has values 1 . . . m, and T has values 1 . . . n;

storing the predictive quality of each predictor attribute in a computer readable medium.

* * * * *